Dec. 4, 1962 A. E. SNYDER ET AL 3,066,324
FLOATS
Filed Feb. 12, 1960 2 Sheets-Sheet 1
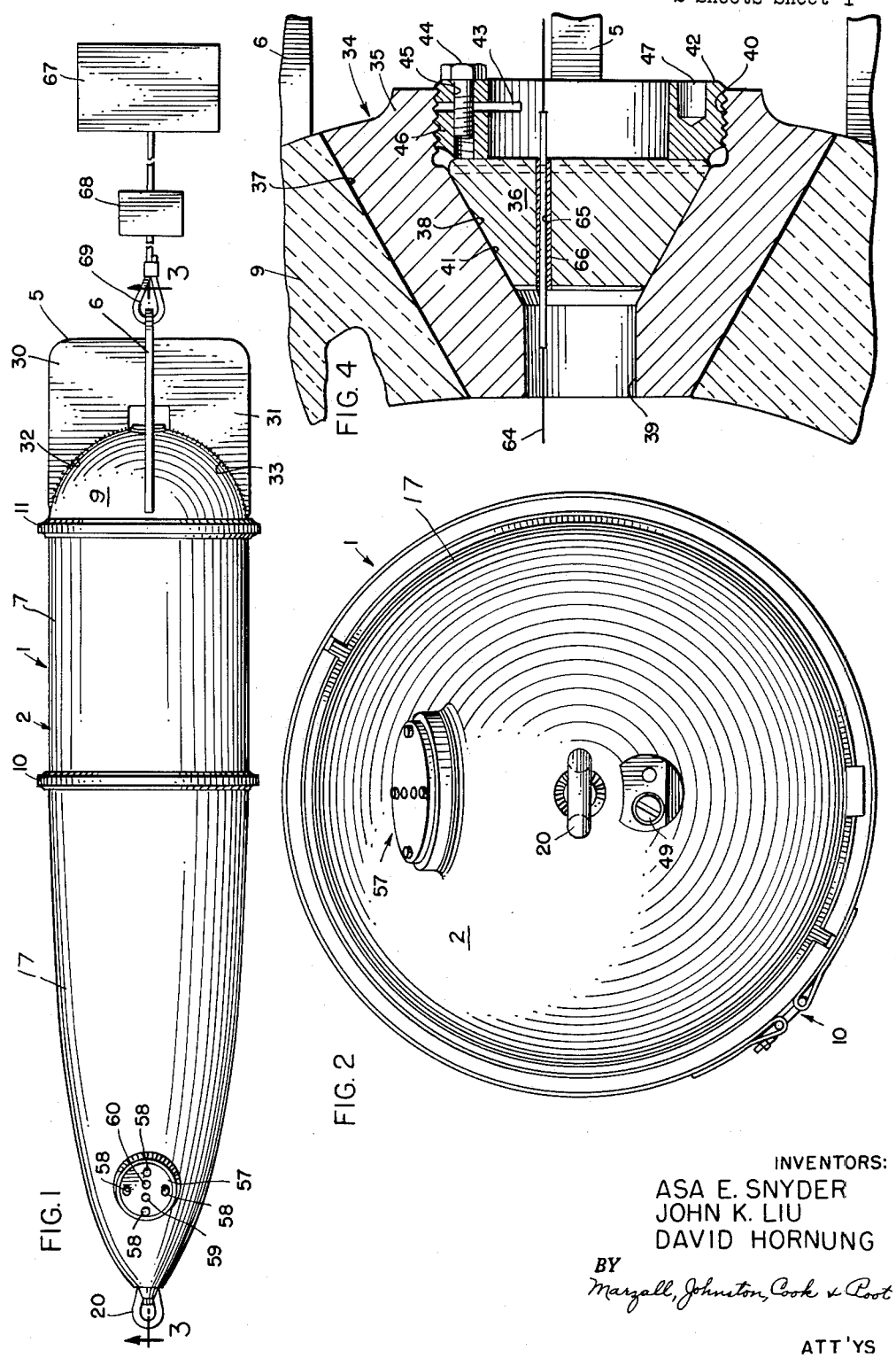
INVENTORS:
ASA E. SNYDER
JOHN K. LIU
DAVID HORNUNG
BY
Marzall, Johnston, Cook & Root
ATT'YS Dec. 4, 1962  A. E. SNYDER ET AL  3,066,324
FLOATS Filed Feb. 12, 1960  2 Sheets-Sheet 2

INVENTORS:
ASA E. SNYDER
JOHN K. LIU
DAVID HORNUNG
BY Marzall, Johnston, Cook & Root
ATT'YS

United States Patent Office 3,066,324
Patented Dec. 4, 1962

3,066,324
FLOATS
Asa E. Snyder, Hinsdale, and David Hornung and John K. Liu, Chicago, Ill., assignors to U.S. Industries, Inc., New York, N.Y., a corporation of Delaware
Filed Feb. 12, 1960, Ser. No. 8,303
3 Claims. (Cl. 9—8)

This invention relates to floats and, more particularly, to floats which are particularly well adapted for carrying pay loads, such as instruments, to the bottom of a body of water, such as, for example, to the bottom of the ocean, and returning the pay load to the surface.

A primary object of the present invention is to afford a novel float for use in oceanographic research and exploration, and the like.

Another object of the present invention is to afford a novel float having parts so constituted and arranged that it may be used to carry a pay load, such as instruments, or the like, down to the bottom of a body of water such as, for example, the ocean, and then return the pay load to the surface, in a novel and expeditious manner.

Another object is to afford a novel and practical float of the aforementioned type which is capable of withstanding, without damage to the float or to the pay load therein, the relatively great pressures encountered at substantial depths in the ocean, such as, for example, the greatest depth known in the oceans.

Yet another object of the present invention is to afford a novel float of the aforementioned type which is relatively small and compact in size.

An object ancillary to the foregoing is to enable a novel float of the aforementioned type to be afforded which is relatively small and compact in size, and yet affords a relatively large space for a pay load and may carry a pay load of substantial weight.

A further object of the present invention is to afford a novel float of the aforementioned type which may be readily and safely handled.

Another object is to afford a novel float of the aforementioned type which is relatively stable during both ascent and descent through a body of water.

Another object is to provide a novel float of the aforementioned type which travels a substantially vertical trajectory in the lowering and raising operations thereof.

Yet another object is to provide a novel float of the aforementioned type which is capable of descending and ascending in a body of water, such as the ocean, at a relatively high speed.

A further object is to provide a novel float of the aforementioned type having a buoyant chamber therein which may be filled with a buoyant liquid, such as, for example, gasoline, or the like.

An object ancillary to the foregoing is to afford a novel float of the aforementioned type wherein the inside and outside pressures on the walls of the buoyant chamber are substantially equalized during both descent and ascent of the float through a body of water even when the outside pressure during such ascent and descent may vary between atmospheric pressure and a pressure of several thousand pounds per square inch.

Another object of the present invention is to afford a novel float of the aforementioned type which is practical and may be readily and economically produced commercially.

Other and further objects of the present invention will be apparent from the following description and claims and are illustrated in the accompanying drawings which, by way of illustration, show a preferred embodiment of the present invention and the principles thereof and what we now consider to be the best mode in which we have contemplated applying these principles. Other embodiments of the invention embodying the same or equivalent principles may be used and structural changes may be made as desired by those skilled in the art without departing from the present invention and the purview of the appended claims.

In the drawings:

FIG. 1 is a side elevational view of a float embodying the principles of the present invention, and diagrammatically showing a releasable ballast attached to the rear end of the float;

FIG. 2 is an enlarged front elevational view of the float shown in FIG. 1;

FIG. 4 is an enlarged detail sectional view of a portion of the float shown in FIG. 3.

Figure 3:
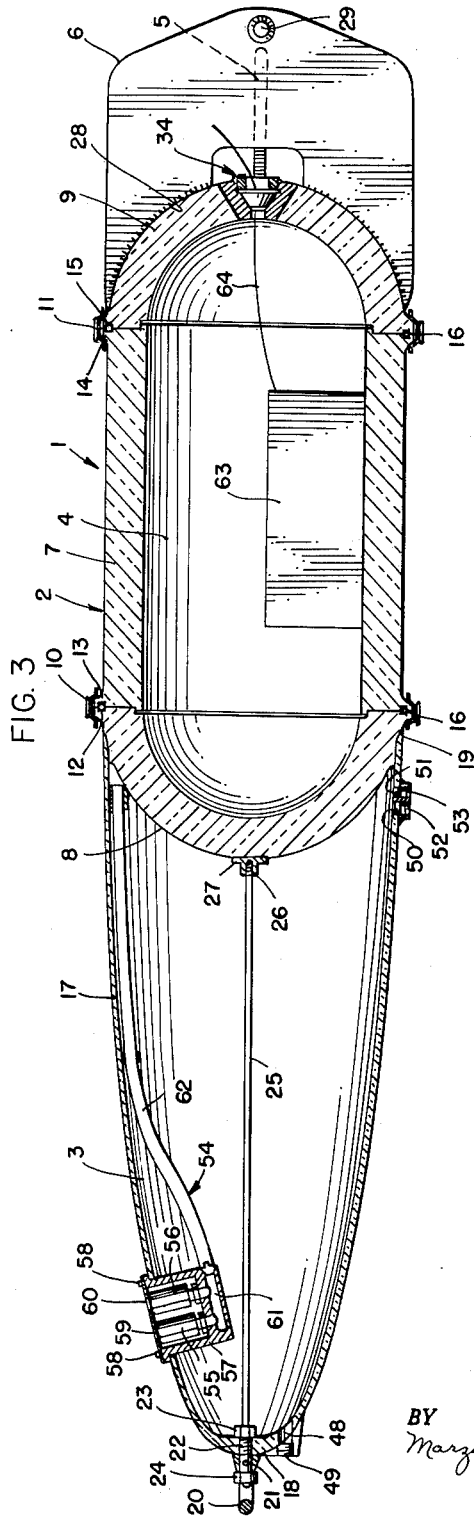
FIG. 3 is an enlarged longitudinal sectional view through the float shown in FIG. 1, taken substantially along the line 3—3 in FIG. 1.

A float 1, embodying the principles of the present invention, is shown in the drawings to illustrate the preferred embodiment of the present invention.

In general, the float 1 embodies an elongated housing 2 having a buoyant chamber 3 at the front end thereof and a pay load chamber 4 at the rear end thereof, two fins 5 and 6 being secured to and extending rearwardly from the rear end or tail end of the housing 2, FIGS. 1 and 3.

The portion of the housing 2 which defines the pay load chamber 4 embodies a substantially cylindrical-shaped central body portion 7 and two oppositely disposed, substantially semi-spherical shaped end portions 8 and 9, FIG. 3. The end portions 8 and 9 are mounted on the front and rear ends of the central portion 7, respectively, in abutting relation thereto and are releasably secured thereto by clamping rings 10 and 11, which are of a type well known in the art, FIGS. 1, 2, and 3. The clamping ring 10, when disposed in normal operative position for holding the end portion 8 on the central body portion 7, is disposed in overlying, holding relation, to radially outwardly projecting ridges 12 and 13 projecting outwardly from the rear end portion of the end portion 8 and the front end portion of the central body 7, respectively, FIG. 3. Similarly, the clamping ring 11, when disposed in normal operative position for holding the rear end portion 9 on the central body portion 7, is engaged with radially outwardly projected ridges 14 and 15 on the rear end portion of the central body portion 7 and on the front end portion of the end portion 9, respectively. Seals 16 made of suitable materials such as, for example, a suitable synthetic rubber such as neoprene, or the like, are mounted between the end portions 8 and 9 and the front and rear ends of the central body portion 7, respectively, FIG. 3, to assist in insuring a liquid-tight and air-tight connection between the end portions 8 and 9 and the central body portion 7.

The portions 7, 8 and 9 of the housing 2 may be made of any suitable material, but preferably are made from a plurality of layers of fiberglass cloth impregnated, bonded together, and sealed with a suitable bonding material such as, for example, a suitable epoxy resin, such as "Epon–815" sold by Shell Oil Company, with the layers of said cloth wound one on top of the other on a mandrel and bonded together by the aforementioned resin. If desired, the portions 7, 8 and 9 may be formed on a suitable mandrel from fiberglass roving, wetted with a suitable material such as, for example, the aforementioned epoxy resin, with the roving laid up in a filament-winding process to the required thickness. If the portions 7, 8 and 9 are formed by such a filament-winding process, the adjacent layers thereof are preferably laid up at equal, alternating, positive and negative angles to the longitudinal axis of the central body portion 7.

The portion 17 of the housing 2 which defines the buoyant chamber 3 is preferably semi-elliptical in shape, FIGS. 2 and 3, having a closed, relatively pointed front end 18 and a relatively wide open rear end 19. Like the portions 7, 8 and 9 of the housing 2, the portion 17 may be made of any suitable material, but is preferably made of fiberglass impregnated with material such as, for example, the aforementioned epoxy resin, and may be made in the same manner as heretofore discussed with respect to the portions 7, 8 and 9.

The rear end 19 of the portion 17 of the housing 2 has an inside diameter which is complementary in size and shape to the outer surface of the front end portion 8 of the portions 7—9 of the housing 2, adjacent to the flange 12. The portion 17 of the housing 2 is mounted on the portion 8 in axial alignment with the portion 7, and is secured to the outer surface of the portion 8 by suitable means such as, for example, bonding it thereto by a suitable bonding agent such as, for example, the aforementioned epoxy resin. The bonding of the portion 17 to the portion 8 of the housing 2 is such as to afford a liquid-tight and air-tight seal therebetween.

A lifting ring 20 having an opening 21 extending through the base thereof, FIG. 3, is secured to the front end portion 18 of the portion 17 of the housing 2 in forwardly projecting relation thereto by a bolt 22 extending through the front end portion 18 and the base 21, with the front end portion 18 and the base 21 clamped between the head 23 of the bolt 22 and a nut 24 threadedly mounted on the bolt 22. The shank of the bolt 22 and the base 21 of the lifting ring 20 may be suitably sealed and bonded to the front end portion 18 of the housing 2 by a suitable bonding material such as, for example, the aforementioned epoxy resin.

An elongated straight rod 25 extends longitudinally through the portion 17 of the housing 2 along the longitudinal axis thereof, and is secured at its front end to the head 23 of the bolt 22 by suitable means such as, for example, welding. The rear end portion 26 of the rod 25 is externally threaded, and is threaded into a nut 27 secured to the front end of the portion 8 of the housing 2 by suitable means such as, for example, the aforementioned epoxy resin. The rod 25 affords a safety device whereby, if the portion 17 of the housing 2 should be damaged in the handling of the float 1, or should be torn away from the pay load chamber portion 7—9 of the float 1, the lifting ring 20 will remain secured to the instrument chamber 4 so that the pay load of the float 1 will not be dropped or lost.

The fins 5 and 6 are in the form of flat sheets. They may be made of any suitable material, but, are preferably made of a plurality of layers of the aforementioned impregnated fiberglass cloth bonded together in the manner previously discussed with respect to the portions 7—9 of the housing 2. The fin 6, shown in the drawings, is in the form of a unitary sheet and has a front edge portion 28 which is complementary to the rear outer surface of the portion 9 of the housing 2 and is secured thereto by suitable bonding material such as, for example, the aforementioned epoxy resin. The front end portion 28 of the fin 6 extends from closely adjacent the flange 15 on one side of the portion 9 through the longitudinal axis of the portion 7 to a position closely adjacent the flange 15 on the diametrically opposite side of the portion 9. An opening 29 is formed in the rear end portion of the fin 6 to enable ballast to be connected to the float 1, as will be discussed in greater detail hereinafter.

The fin 5 is made in the form of two separate sheets 30 and 31 disposed in uniplanar relation to each other on opposite sides of the fin 6 in abutting engagement with the respective opposite faces of the latter. The portions 30 and 31 of the fin 5 have front edge portions 32 and 33, respectively, disposed in abutting juxtaposition to the rear outer face of the portion 9 of the housing 2, and are secured thereto by a suitable bonding material such as, for example, the aforementioned epoxy resin. Similarly, the portions 30 and 31 of the fin 5 are bonded to the adjacent faces of the fin 6 by suitable material such as, for example, the aforementioned epoxy resin.

A plug 34, including a fixed portion 35 and a removable portion 36, is mounted in and extends through the rear end of the portion 9 of the housing 2 in axial alignment with the cylindrical-shaped portion 7 of the housing 2. The fixed portion 35 is of substantially truncated-cone-shape and is mounted in a truncated-cone-shaped opening 37 extending through the rear end of the portion 9 of the housing 2, FIGS. 3 and 4. The fixed portion 35 of the plug 34 is of such size and shape that it fits snugly in the opening 37, and it is secured to the portion 9 by a suitable bonding agent such as, for example, the aforementioned epoxy resin.

The fixed portion 35 of the plug 34 has an opening 38 extending therethrough in longitudinal alignment with the portion 7 of the housing 2, the opening 38 having substantially cylindrical-shaped inner and outer end portions 39 and 40, respectively, separated by a substantially truncated-cone-shaped central portion 41, FIG. 4.

The removable portion 36 of the plug 34 is of truncated-cone-shape and is of such size and shape as to fit snugly in the central portion 41 of the opening 38. The inner surface of the central portion 41 of the opening 38, and the outer peripheral surface of the removable plug 36, preferably have a polished finish so that when the removable portion 36 of the plug 34 is disposed in firmly seated, operative position in the opening 38, a liquid-tight and air-tight seal is afforded between plugs 35 and 36.

The outer end portion 40 of the opening 38 in the fixed portion 35 of the plug 34 is internally threaded, and an annular-shaped locknut 42 is threadedly engaged therewith and is normally disposed in firm abutting engagement with the removable portion 36 of the plug 34 to thereby firmly hold the removable portion 36 in tight engagement with the fixed portion 35. The nut 42 has a radially extending split or recess 43 formed in one portion thereof, and a bolt 44 projects into an opening 45 formed in the nut 42 transversely to the slit 43, the bolt 44 being threaded into the portion 46 of the nut 42 disposed inwardly of the slit 43 to thereby afford a jamb bolt for holding the nut 42 in position in the opening 38.

The portions of the plug 34 may be made of any suitable material but, preferably, the fixed portion 35 and the removable portion 36 are formed of stainless steel, with the nut 42 and the bolt 44 made of brass.

Openings 47 may be formed in the outer face of the nut 42 whereby the nut 42 may be readily inserted into and removed from the fixed portion 35 of the plug 34 by simple means such as, for example, by use of a suitable spanner wrench, or the like.

As may be seen in FIG. 3, the portion 17 of the housing 2 has an opening 48 formed in the front end portion 18 thereof, the opening 48 being normally closed by a removable threaded plug 49. Two other openings 50 and 51 are formed in the portion 17 of the housing 2 adjacent to the portion 8, the openings 50 and 51 being normally closed by removable threaded plugs 52 and 53, respectively.

The buoyant chamber 3 of the novel float 1 affords a container which is intended to be filled with a buoyant liquid, that is, a liquid having a density less than the density of the liquid in which the float 1 is to be used. The filling of the buoyant chamber 3 of the float 1 may be accomplished through any one of the openings 48, 50 and 51, the choice of which opening to use normally depending upon the position of the float 1 during the filling operation. Thus, for example, if float 1 is disposed in upstanding position, during the filling operation, with the end portion 18 disposed at the top thereof, the opening 48 would normally be used for such an operation. If, on the other hand, the float 1 is disposed in horizontally extending position, it would normally be disposed in such position during the filling operation that the openings 50 and 51 are at the upper side thereof, and the filling of the buoyant chamber 3 could then be accomplished through either of the openings 50 or 51.

Pressure-equalizing apparatus 54 is mounted in the front end portion of the portion 17 of the housing 2, FIG. 3, for the purpose of maintaining substantially the same pressure on the inside and outside of the buoyant chamber 3 during ascent and descent of the float 1 in a body of water. The pressure-equalizing apparatus includes two check valves 55 and 56 mounted in a housing 57, which extends through the portion 17 of the housing 2. The housing 57 is secured to the portion 17 by suitable means such as bolts 58, and the check valves 55 and 56 have outer end portions which are in communication with openings 59 and 60, respectively, which extend outwardly through the housing 57, FIGS. 1, 2 and 3. The inner end portions of the check valves 55 and 56 are in communication with a chamber 61 in the inner end portion of the housing 57, and a tubular member, made of suitable material such as, for example, rubber or stainless steel, is secured to the housing 57 in communication with the chamber 61 and extends rearwardly therefrom through the buoyant chamber 3 into the extreme rear end portion of the buoyant chamber 3.

The check valve 55 is inwardly opening, and the check valve 56 is outwardly opening. Thus, it will be seen that when the pressure on the outside of the buoyant chamber 3 exceeds the pressure in the chamber 3 by an amount corresponding to the setting of the check valve 5, the check valve 5 will open to thereby permit inward flow therethrough and prevent an excessive pressure differential between the greater outside pressure and inside pressure of the chamber 3. On the other hand, when the pressure in the chamber 3 builds up sufficiently that it exceeds the pressure outside of the float 1 by an amount exceeding the setting of the check valve 56, the latter will open to thereby permit outward flow therethrough to relieve the excessive pressure in the chamber 3.

In the operation of our novel float 1, the clamping strap 11 may be removed from the housing 2, and the rear end portion 9, together with the fins 5 and 6 may then be removed from the housing 2. This, it will be seen, opens the rear end of the pay load chamber 4, and the operator may then place the desired pay load, such as the pay load 63 shown diagrammatically in FIG. 3, in the pay load chamber 4. The pay load 63 may be secured in position in the chamber 4 by suitable securing means, not shown, and, if desired, electrical wires such as, for example, the wire 64, may be connected to the pay load and extended outwardly through the plug 34. If this is done, relatively small openings 65 may be drilled through the removable portion 36 of the plug 34, and the wires such as the wire 64 extended through the openings 65. The openings 65 may then be filled with a suitable sealing compound such as, for example, molten glass 66, to afford an air-tight and liquid-tight seal around the wire 64 through the plug 34. The end portion 9 may then again be placed in operative position on the portion 7 of the housing 2 and secured thereto by the clamping ring 11.

Thereafter, the buoyant chamber 3 of the float 1 may be filled with a suitable buoyant liquid, the liquid being fed into the chamber 3 through the selected opening 48, 50 or 51, depending upon the position of the float 1, and the opening 48, 50 or 51 again closed by the plug 49, 52 or 53, respectively. Any suitable liquid having a density sufficiently less than the density of the liquid in which the float 1 is to be used, may be used to fill the buoyant chamber 3, such as, for example, gasoline or lithium. However, because it is relatively easy to handle, and is relatively readily available, we prefer to use debutanized absorption naphtha for this purpose.

Thereafter, suitable releasable ballast of suitable size and weight, such as, for example, the ballast 67 having a releasing mechanism 68, shown diagrammatically in FIG. 1, may be secured to the tail fin 6 by suitable means such as a cable 69 extended through the opening 29. The releasing mechanism 68 may be any one of several different forms of suitable releasing mechanisms which are well known in the art, such as, for example, the releasing mechanism shown in United States Letters Patent No. 2,405,990, issued to J. T. Beechlyn on August 20, 1946. The ballast 67, and the releasing mechanism 68 therefor, form no part of the present invention except, insofar as they may form a part of our novel combination, and may be any one of several different forms of suitable releasable ballast heretofore well known in the art. Therefore, it is unnecessary to describe, in detail, the ballast or the releasing mechanism therefor, for a full understanding of the present invention.

After the float 1 has thus been readied for operation, it may be raised by suitable means, such as, for example, a suitable winch, not shown, into upright, vertically extending position, with the front end portion 18 thereof disposed upwardly, and with the ballast 67 depending from the lower end of the float 1. The float 1 may then be lowered in this position into the ocean, or the like, and the lifting ring 20 released from the lifting means. The weight of the ballast 67 is such that it, combined with the weight of the float 1, with the buoyant liquid and the pay load therein, is sufficient to cause the float 1 to descend into the ocean. The shape of float 1 is such, and the parts thereof are so constituted and arranged, that the descent thereof into the ocean is substantially in a straight line, with relatively little oscillation of the float 1, and with little or no rotation thereof around its longitudinal axis.

In the use of the float 1 in oceanographic research and exploration, and the like, it may be necessary for it to descend to the greatest depths known in the oceans, at which the external pressure thereon becomes relatively great, such as, for example, in the neighborhood of sixteen thousand pounds per square inch. The portions 7, 8 and 9 of the housing 2 are of such size and thickness, and are of such shape, that they will withstand such relatively high pressures, the portions 7—9 of the housing 2 being liquid-tight and air-tight so that the pressure within the pay load chamber 4 remains at substantially atmospheric pressure even under the much greater external pressures thereon.

However, it is desirable that the float 1 be relatively light in weight. To assist in accomplishing this, the portion 17 of the housing 2 is substantially thinner in thickness, so as to reduce the weight of the float 1 as much as practicably possible. It will be remembered that the buoyant chamber 3 is completely filled with buoyant liquid such as, for example, the aforementioned naphtha or gasoline, prior to the descent of the float 1 into the ocean. Liquids, such as gasoline, and the like are of course, commonly considered to be incompressible. However, even such socalled "incompressible" liquids do compress to a certain extent under pressures as high as sixteen thousand pounds per square inch, debutanized naphtha or gasoline compressing as much as two or three percent under such pressures. Thus, it will be seen that if the float 1 were not so constituted and arranged as to maintain the outside and inside pressures on the portion 17 of the housing 2 substantially equal, the pressure differential between the outside and inside of the buoyant chamber 3 during a descent of the float 1 to the greatest depth known in the oceans, would be sufficient to compress the liquid in the buoyant chamber 3 sufficiently that the portion 17 might be deflected inwardly sufficiently to rupture or crack the same, and cause the float 1 to fail.

However, it will be remembered that the check valves 5 and 6 are affixed in the portion 17 of the housing 2 for the purpose of maintaining the pressure inside and outside the buoyant chamber 3 substantially equal. The check valves 5 and 6 may be set to open at any desired pressure differential. However, we prefer to set each of the check valves 55 and 56 so that they will open upon a five-pound pressure differential.

Therefore, it will be seen that during the descent of the float 1 into the ocean, the check valve 55 opens when the pressure on the outside of the portion 17 of the housing 2 becomes more than five pounds greater than the pressure on the inside thereof. This permits ocean water to flow inwardly through the check valve 55, the recess 61 in the housing 57, and the tube 62 into the then lower end portion of the buoyant chamber 3. This inward flow of salt water into the buoyant chamber 3 is limited to the volume necessary to make up for the amount that the gasoline in the buoyant chamber 3 is compressed and, therefore, never exceeds more than two or three percent of the total volume of gasoline in the buoyant chamber 3 during operations of the aforementioned type wherein the pressures to which the float 1 are subjected are sufficient to compress gasoline two or three percent.

At the completion of the descent of the float 1 into the ocean, the release mechanism 68 is suitably actuated to release the ballast 67 therefrom. When this occurs, the total weight of the float 1 and the load which it carried during the descent, is reduced sufficiently that the float 1 with the gasoline and the pay load therein is sufficiently buoyant to again ascend to the surface of the ocean. During the ascent, the more buoyant portion of the float 1 being the buoyant chamber 3, the float 1 ascends with its front end portion 18 pointing upwardly.

During the ascent of the float 1, the pressure on the outside thereof, of course, becomes less. As this occurs, the previously compressed gasoline again expands, and as the pressure on the inside of the buoyant chamber 3 exceeds the pressure on the outside thereof by a pressure greater than the setting of the check valve 56, such as, for example, the aforementioned five-pound pressure, the liquid again flows outwardly through the tube 62, the chamber 61 in the housing 57, and the check valve 56 into the surrounding ocean. The open end of the tube 62 is then disposed in the lower end portion of the buoyant chamber 3, and the salt water, which has previously flowed inwardly through the check valve 55 into the buoyant chamber 3, being heavier than water is likewise disposed in the lower end portion of the buoyant chamber 3. Therefore, it is primarily salt water which flows outwardly through the tube 62, the chamber 61 and the check valve 56, so that very little, if any, gasoline is lost through the check valve 56 during the ascent of the float 1.

After the float 1 has completed its ascent, it will float on the surface of the ocean, and may be readily picked up by suitable means such as, for example, the aforementioned winch, which may be attached to the lifting ring 20 to lift the float 1 from the ocean.

Even if, in the handling of the float 1, the front end portion 17 of the housing 2 should be damaged or even torn from the rear end portion 7—9 thereof, it will be seen that there is no danger of the pay load chamber being released from the lifting ring 20, the rod 25 acting as a safety rod connecting the ring 20 to the portion 7—9 of the housing 2 defining the pay load chamber 4.

With the float 1 constructed in accordance with the principles of the present invention, it is possible to afford a float of relatively small size which is capable of carrying a comparatively large and heavy pay load. Thus, for example, a float having a maximum diameter of twenty-one inches and a maximum length of eleven feet may be afforded which would afford a pay load chamber of six cubic feet, and a buoyant chamber having a capacity of five cubic feet. In such a float, the portion 7—9 of the housing 2, when made of fiberglass in the aforementioned manner, could have a thickness of two and one-half inches, and the portion 17 could have a wall thickness of one-quarter inch. With this construction, the buoyant chamber 3, when filled with a gasoline having a density of forty-two and one-half pounds per cubic feet, would afford the necessary buoyant power to raise the float 1, carrying a pay load of one hundred and fifty pounds, from a depth of fifteen thousand feet in the ocean in a practical period of time, of approximately fifteen minutes. With this construction, also, a ballast of one hundred and fifty pounds would be sufficient to cause the float 1, so loaded, to descend to a level of approximately fifteen thousand feet in approximately fifteen minutes. Under these conditions, and with the pay load properly distributed in the pay load chamber 4, so that during ascent of the float 1, the center of buoyancy is disposed approximately six inches above the center of gravity of the float 1, the oscillation of the float 1 during ascent thereof is relatively small.

From the foregoing it will be seen that the present invention affords a novel float which is practical and efficient in construction and operation, and radially adapts itself for use in oceanographic research and exploration, and the like.

Also, it will be seen that the float 1 affords effective protection for the pay load to be carried thereby, and will descend and ascend in the ocean, or the like, in a practical manner and at a practical rate of speed.

Thus, while we have illustrated and described the preferred embodiment of our invention, it is to be understood that this is capable of variation and modification, and we therefore do not wish to be limited to the precise details set forth, but desire to avail ourselves of such changes and alterations as fall within the purview of the following claims.

We claim:

1. A free float comprising an elongated housing having a wall portion defining a pay load chamber in one end of said housing, and another wall portion defining a buoyant chamber in the other end of said housing, said first mentioned wall portion comprising a substantially cylindrical-shaped central portion and two substantially semi-spherical-shaped end portions releasably secured to respective ends of said central portion in closing relation thereto, said other wall portion being of semi-elliptical shaped cross-section longitudinally of said housing, said other wall portion having an open end sealed to one of said semi-spherical-shaped end portions, two check valves mounted in and extending through said other wall portion, one of said check valves being an inwardly opening valve and the other of said check valves being an outwardly opening valve, said check valves being set to open at a predetermined pressure differential between the outside of said housing and the inside of said buoyant chamber, conduit means having one end connected to said check valves and the other disposed in said buoyant chamber closely adjacent to said one semi-spherical-shaped end portion, and stabilizing fins mounted on the other of said semi-spherical-shaped end portions and projecting therefrom in a direction away from said one semi-spherical-shaped end portion.

2. A free float as defined in claim 1 and which includes a lifting ring mounted on and projecting outwardly from the end of said other wall portion disposed opposite to said one end thereof, and in which one of said fins has an opening therein for receiving fastening means for attaching ballast to said housing.

3. A free float as defined in claim 1 and in which said wall portions comprise layers of fiberglass bonded together and sealed with a bonding agent, and in which said one wall portion is thicker than said other wall portion.

References Cited in the file of this patent

UNITED STATES PATENTS

| | | |
|---|---|---|
| 1,180,366 | Asbury | Apr. 25, 1916 |
| 1,879,735 | D'Albay | Sept. 27, 1932 |
| 2,371,404 | Mumford | Mar. 13, 1945 |
| 2,405,990 | Beechlyn | Aug. 20, 1946 |
| 2,587,564 | Williams | Feb. 26, 1952 |
| 2,635,574 | Sturtevant | Apr. 21, 1953 |
| 2,790,186 | Carapellotti | Apr. 30, 1957 |
| 2,833,682 | De Laszlo | May 6, 1958 |

UNITED STATES PATENT OFFICE
CERTIFICATE OF CORRECTION

Patent No. 3,066,324 December 4, 1962

Asa E. Snyder et al.

It is hereby certified that error appears in the above numbered patent requiring correction and that the said Letters Patent should read as corrected below.

Column 5, line 51, for "5", each occurrence, read -- 55 -- column 7, lines 16 and 19, for "5 and 6", each occurrence, read -- 55 and 56 --.

Signed and sealed this 29th day of October 1963.

(SEAL)
Attest:

ERNEST W. SWIDER
Attesting Officer

EDWIN L. REYNOLDS
Acting Commissioner of Patents